(12) United States Patent
Baras et al.

(10) Patent No.: US 8,606,806 B2
(45) Date of Patent: Dec. 10, 2013

(54) STATIC TYPING OF XQUERY EXPRESSIONS IN LAX VALIDATION CONTENT

(75) Inventors: Adrian Sorin Baras, Redmond, WA (US); Michael Rys, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 625 days.

(21) Appl. No.: 12/179,647

(22) Filed: Jul. 25, 2008

(65) Prior Publication Data

US 2010/0023486 A1 Jan. 28, 2010

(51) Int. Cl.
G06F 7/00 (2006.01)
G06F 17/30 (2006.01)

(52) U.S. Cl.
USPC ........................................................ 707/761

(58) Field of Classification Search
USPC ........................... 707/759, 760, 761, 765, 803
See application file for complete search history.

(56) References Cited

U.S. PATENT DOCUMENTS

| | | | |
|---|---|---|---|
| 7,254,573 B2 | 8/2007 | Burke | |
| 7,587,667 B2 * | 9/2009 | Scardina et al. | 715/230 |
| 7,827,177 B2 * | 11/2010 | Murthy | 707/736 |
| 2003/0033296 A1 | 2/2003 | Rothmuller | |
| 2004/0194057 A1 * | 9/2004 | Schulte et al. | 717/114 |
| 2004/0199572 A1 * | 10/2004 | Hunt et al. | 709/201 |
| 2004/0261018 A1 * | 12/2004 | Dunne et al. | 715/513 |
| 2004/0267760 A1 * | 12/2004 | Brundage et al. | 707/100 |
| 2005/0050549 A1 * | 3/2005 | Joseph et al. | 719/313 |
| 2005/0177578 A1 | 8/2005 | Chen et al. | |
| 2005/0268223 A1 * | 12/2005 | Hanson et al. | 715/513 |
| 2005/0289125 A1 | 12/2005 | Liu et al. | |
| 2006/0085489 A1 * | 4/2006 | Tomic et al. | 707/200 |
| 2006/0184584 A1 | 8/2006 | Dunn | |
| 2006/0242115 A1 | 10/2006 | Baras et al. | |
| 2006/0251292 A1 | 11/2006 | Gokturk | |
| 2007/0011178 A1 | 1/2007 | Dumitru et al. | |
| 2007/0250766 A1 * | 10/2007 | Medi et al. | 715/513 |
| 2007/0282894 A1 | 12/2007 | Schneider | |
| 2007/0288429 A1 | 12/2007 | Liu et al. | |
| 2007/0299834 A1 * | 12/2007 | Liu et al. | 707/4 |
| 2008/0017722 A1 * | 1/2008 | Snyder et al. | 235/494 |
| 2008/0040657 A1 * | 2/2008 | Kuznetsov et al. | 715/234 |
| 2008/0046453 A1 * | 2/2008 | Kostoulas et al. | 707/101 |
| 2008/0114724 A1 * | 5/2008 | Indeck et al. | 707/2 |
| 2008/0147723 A1 * | 6/2008 | Meliksetian et al. | 707/103 R |
| 2008/0162649 A1 | 7/2008 | Lee | |
| 2008/0222087 A1 * | 9/2008 | Balmin et al. | 707/2 |
| 2009/0063401 A1 * | 3/2009 | Harbarth et al. | 707/2 |

OTHER PUBLICATIONS

Fernandez, et al. Implementing XQuery 1.0: The Galax Experience. Proceedings of the 29th VLDB Conference, Berlin, Germany, 2003. http://www.cs.rutgers.edu/~amelie/papers/2003/galaxdemo.pdf.

(Continued)

*Primary Examiner* — Wilson Lee
*Assistant Examiner* — Mark E Hershley

(57) ABSTRACT

Systems and methods that extend static typing rules/algorithms of the World Wide Web Consortium (W3C) rules, with a more precise static typing algorithm that supplies knowledge for types occurring in the Lax validation section. The Lax validation can be identified, and associated expressions known with particularity, wherein types can be inferred for XQuery expressions that navigate down into the Lax validation section. An annotation component annotates elements (e.g., wild card sections) with additional information about wild card sections, and a mapping component maps Lax wild cards to type systems.

20 Claims, 8 Drawing Sheets

(56) References Cited

OTHER PUBLICATIONS

Borkar, et al. Query Processing in the AquaLogic Data Services Platform. http://db.ucsd.edu/pubsFileFolder/263. pdf. Last accessed Jun. 19, 2008.

D. Chamberlin. XQuery: An XML query language. https://www.research.ibm.com/journal/sj/414/chamberlin.html. Last accessed Jun. 19, 2008.

W3C. XML Path Language (XPath) 2.0. http://www.licence.info.upmc.fr/lmd/licence/2005/ue/xmla-2006fev/XPath2_0.pdf. 2003.

"Why does the picklist show multiple names for the same person?" Retrieved at <<http://www.whollygenes.com/forums201/index.php?showtopic=311>>, Aug. 15, 2004, pp. 1-2.

Boyce. "Manage multiple identities masterfully in Windows 2000 Professional", Retrieved at <<http://articles.techrepublic.com.com/5100-10878_11-6104818.html >>, Aug. 14, 2006, pp. 1-2.

Dumbill, "XML Watch: Finding friends with XML and RDF", Retrieved at <<http://www.ibm.com/developerworks/xml/library/x-foaf.html>>, Jun. 1, 2002, pp. 1-7.

Sowe, et al., "Identifying knowledge brokers that yield Software Engineering knowledge in OSS Projects", Retrieved at <<http://opensources.mit.edu/papers/IST-Vol-48/11/2006.pdf>> Information & Technology48 (2006), pp. 1025-1033.

"Identifying a person from email address", Retrieved at <<http://answers.google.column/answers/threadview/id/165850. html>>, Feb. 22, 2003, pp. 2.

* cited by examiner

PREVIOUSLY DEFINED
STATIC SCHEMA
CONTEXT

ANNOTATION
COMPONENT — 210

Type inferencing of path
expressions on Lax
validation wild card
sections

ANNOTATION
COMPONENT — 310

MAPPING
COMPONENT — 320

STATIC TYPING OF XQUERY EXPRESSIONS IN LAX VALIDATION CONTENT

BACKGROUND

As programming approaches and foundations have evolved, application programming interfaces (APIs) and programming schemas have been developed to standardize and unify programming methodologies that were previously multi-variant and relatively incompatible. Modern programming therefore often involves employing APIs and schemas in conjunction with reusable libraries. Such Programming languages continue to evolve to facilitate specification by programmers as well as efficient execution. For example, a significant component in functionality of Web Services is programmatic interaction with web data.

In general, there are three major components that make up the world of web data—relational data (e.g., SQL), self-describing data (e.g., XML), and a runtime environment. A popular method of implementing a relational data model is by means of SQL (Structured Query Language). SQL is a language used to communicate with a relational database management system such as SQL Server, Oracle or Access—data in a relational database system is typically stored in tables. An accepted standard for self-describing data is XML (eXtensible Markup Language). XML is a World Wide Web Consortium (W3C) standard language that describes data via a schema or Document Type Definition (DTD). XML data is stored through the use of tags. A runtime environment is a general-purpose multilanguage execution engine (e.g., Common Language Runtime (CLR)) that allows authors to write programs that use both relational data and self-describing data.

XML provides syntax for describing heterogeneous graph(s) of data where typing rules (usually called "schema validation") are optional and loosely bound to those type instances. Furthermore, the XML schemas associated with those documents can describe more complex structures with sequences, choices, unbounded type collections, and a combination of typed and untyped data. Such constructs are designed to allow a loosely coupled architecture that minimizes hard dependencies between different parties that make up a complex distributed system and have proven to be an effective way to make distributed systems scale up to a level of complexity required for today's interconnected business systems.

Accordingly, wildcard characters can be employed to increase flexibility in what is allowed to appear in a content model. These characters are supported in the XSD language in ways such as: element wildcard characters, represented by the <xsd:any> element; Attribute wildcard characters represented by the <xsd:anyAttribute> element. Moreover, both wildcard character elements, <xsd:any> and <xsd:anyAttribute>, support the use of a processContents attribute. Such enables specifying a value that indicates how XML applications handle the validation of document content associated with these wildcard character elements. For example, the strict value specifies that the contents are fully validated; the skip value specifies that the contents are not validated; the lax value specifies that only elements and attributes for which schema definitions are available are validated.

Furthermore, the XQuery language provides for static type analysis and static type checking. Typically, to perform static type analysis XQuery employs any available XML Schema information tied to the queried data, if available to improve the preciseness of the inferred type. XML Schemas can contain very strict type constraints, for which inferring a type is fairly straight forward, but it also provides so called "laxly" validated content models and attributes expressed by the content type xs:anyType, the xs:anyAttribute and xs:any wildcard sections with the processContent property set to Lax. Such process content lax requires content model/data to be strictly validated/correct whenever a schema component can be found. Alternatively, if no schema component is found, no requirement of validation exists and such data can be considered very loosely typed.

SUMMARY

The following presents a simplified summary in order to provide a basic understanding of some aspects of the claimed subject matter. This summary is not an extensive overview. It is not intended to identify key/critical elements or to delineate the scope of the claimed subject matter. Its sole purpose is to present some concepts in a simplified form as a prelude to the more detailed description that is presented later.

The subject innovation extends static typing rules/algorithms of the World Wide Web Consortium (W3C) rules, to a more precise static typing algorithm that supplies knowledge for types occurring in the Lax validation section—wherein, such Lax validation can be identified, and the associated expressions known with particularity. Accordingly, types can be inferred for XQuery expressions that navigate down into the Lax validation section, and a more precise type rule is obtained (as compared to current W3C algorithms.) Such facilitates checking compatibility of types at time when operations are to be performed, with expected types (e.g., a check for numeric types—as opposed to any type—for mathematical operation), wherein expressions can be compiled with knowledge for the types involved, and errors mitigated/ optimizations introduced. In a related aspect, an annotation component annotates elements (e.g., wild card sections) with additional information about wild card sections. Such annotation component can further be associated with a mapping component that maps Lax wild cards to type systems. As such, nodes can be annotated for a path expression, when a parser traverses nodes of a tree.

According to a methodology of the subject innovation, initially a Lax wildcard section in a collection of XML schemas is mapped into the XQuery type system. Subsequently, elements and attributes that are Laxly validated can be annotated with additional wild card constraint information. As such, when an XQuery is received that queries using path expressions into a Lax validation section, the subject innovation can supply type information and type inference rules to infer new static type information. This preserves knowledge of what types can be encountered within a Lax validation section, to enable a more precise inference as compared to W3C rules.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

The various aspects of the subject invention are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

In general, conventional and existing XQuery standard provides minimal rules for the type inferencing of queries that delve into lax validation sections. For example, such conventional approaches merely consider all lax elements and attributes to be of the most generic content type (xs:anyType for elements, xs:anySimpleType for attributes); and hence do not provide more exact information. As such, many perfectly legitimate queries typically fail static type checks, because the inferred type is too broad, and hence needs to be rejected. For example, assuming one has the following XML Schema components, where the element E has a lax validation xs:anyType content model and the element integer is of the xs:integer type:

```
<xs:schema
    xmlns:xs="http://www.w3.org/2001/XMLSchema"
    targetNamespace="urn:laxdemo"
    xmlns:x="urn:laxdemo"
    elementFormDefault="qualified">
  <xs:element name="E" type="xs:anyType"/>
  <xs:element name="integer" type="xs:integer"/>
</xs:schema>
```

Then, upon writing the following XQuery,
declare namespace lax="urn:laxdemo";
(/lax:E/lax:integer)[1]+1
the XQuery standard rules will infer a type of element(lax: integer, xs:anyType)? For the expression (/lax:E/lax:integer) [1], which then leads to a type error with the + operation since the atomized type handed to the + operation are xs:any- AtomicType* on the left-hand side and xs:integer on the right hand side which lead to a static type error.

Figure 1:
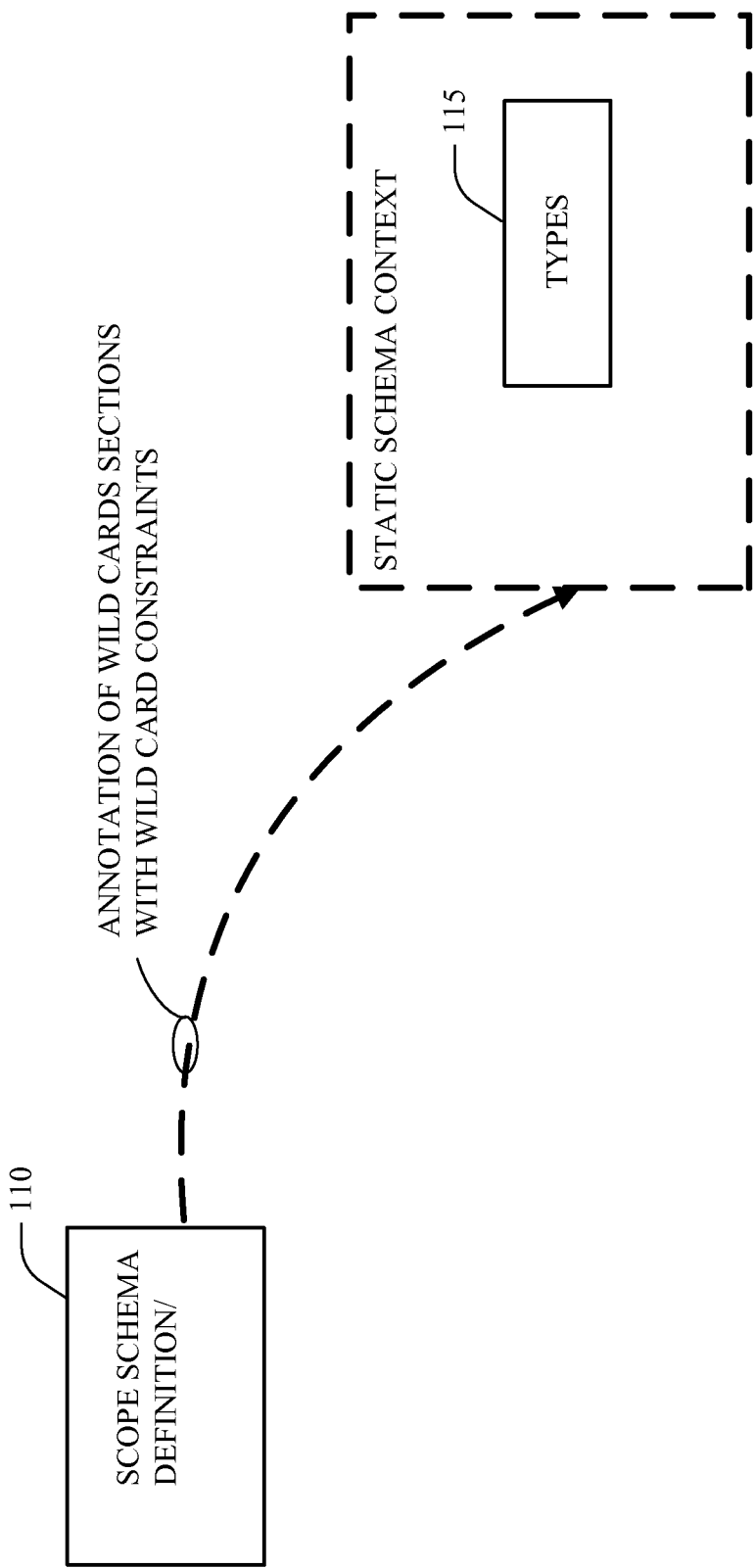
FIG. 1 illustrates an extension of static typing rules/algorithms of the World Wide Web Consortium (W3C) rules in accordance with an aspect of the subject innovation.

The subject innovation provides for an extension to the typing rules algorithms of the World Wide Web Consortium (W3C) rules, to create a more precise static typing algorithm that supplies knowledge for types occurring in the Lax validation section—wherein such Lax validation can be identified, and associated expressions known with particularity. As illustrated in FIG. 1 the types 115 can be inferred for XQuery expressions based on the XML schemas that are associated with the in-scope schema definitions 110 (of W3C), to obtain a more precise type rule (as compared to current W3C algorithms.) Such facilitates checking compatibility of types at time when operations are to be performed, with expected types (e.g., a check for numeric types—as opposed to any type—for mathematical operation), wherein expressions can be compiled with knowledge for the types involved, and errors mitigated/optimizations introduced.

To better appreciate novelties of the subject innovation the following discussion provides for two particular use case examples of what users deem important when employing Lax validation semantics.

I. Use Case 1: Querying XML Data Inside Element of Type xs:anyType

A SQL Server system employs an XML datatype that is constrained by an XML Schema collection (the SQL Server mechanism to define the inscope schema components) that contains a base XML Schema describing the generic properties and uses an element of type xs:anyType to allow users to either use some pre-defined markup in the schema or use its own. An information worker (e.g., "Irene") authors XML documents that makes use of the lax semantics of the element's xs:anyType. In addition, a database developer, (e.g., "Dave") writes queries against the data in the xs:any-Typed element and desires such queries to exploit the schema type knowledge and obtain the type information of the pre-defined markup elements.

II. Use Case 2: Querying XML Data Inside a lax Validation Section

A SQL Server system employs an XML datatype that is constrained by an XML Schema collection that contains a base XML Schema describing the generic properties and uses a lax wildcard section that allows other XML Schemas in the XML Schema collection to define the types in the section or allows the use of unknown elements.

"Dave", the database developer writes an application that augments the base XML Schema with another schema that describes the application specific extensions in the lax wild-card section. "Dave" can write queries against the data in the lax wildcard section and desires the queries to exploit the schema type knowledge and obtain a similar behavior and experience as if the data was typed strict for the data that he knows he has a schema. As described in detail infra, the subject innovation enables static typing rules for querying into laxly validated wildcards and xs:anyType sections that supersedes and augments current W3C algorithms.

In general, XML Schema provides two wildcard sections and the type xs:anyType that implies a laxly validated wild-card content model. The attribute wild card section can be defined as:

```
<anyAttribute
    id = ID
    namespace = ((##any | ##other)
        | List of (anyURI | (##targetNamespace |
```

-continued

```
        ##local)) ) : ##any
            processContents = (lax | skip | strict) : strict
            {any attributes with non-schema namespace ...} >
            Content: (annotation?)
    </anyAttribute>
```

The element wildcard in the XML Schema Structures recommendation) can be defined as:

```
    <any
        id = ID
        maxOccurs = (nonNegativeInteger | unbounded) : 1
        minOccurs = nonNegativeInteger : 1
        namespace = ((##any | ##other)
            | List of (anyURI | (##targetNamespace |
##local)) ) : ##any
        processContents = (lax | skip | strict) : strict
        {any attributes with non-schema namespace ...} >
        Content: (annotation?)
    </any>
```

(It is noted that the type xs:anyType corresponds to an <xs:any processContents="lax"/>)

Typically, Lax validation of an element content wild card represents that given a sequence of elements $se that are inside a lax wildcard or the content of an element typed with xs:anyType, the following rules can be applied:

Assuming that the given XML Schema collection consists of the set of schema components (SC); and that the lax validation section is constrained with the namespace constraints (NS). For every element $e in $se one can check that:
  a. if the name matches an element declaration $ed in SC constrained by NS
  b. then: validate the element $e according to the element declaration $ed. If validation fails, raise a validation error, otherwise type the element according to $ed.
  c. else if namespace-uri($e) was not part of NS then raise validation error.
  d. else if namespace-uri($e) is part of NS check if an xsi:type attribute is present on $e and the type name matches a global type declaration $td in SC constrained by NS.
     i. then: validate the element $e according to the type declaration $td. If validation fails, raise a validation error, otherwise type the element according to $td.
     ii. else:
        I. for every (non-local) attribute $a on $e check:
           a. if the name matches an attribute declaration $ad in SC constrained by NS.
           b. then: validate the attribute $a according to the attribute declaration $ad. If validation fails, raise a validation error, otherwise type the attribute according to $ad.
           c. else: treat the attribute as untyped. Annotate it with the type xs:anySimpleType.
        II. Consider $e to be unvalidated and typed with xs:anyType. Apply rule c above recursively on all element children inside $e as $se by changing NS to be ##any.

Lax validation of an attribute content wildcard indicates that given a sequence of attributes $sa that are validated according to the lax wildcard, the following rules will be applied:

Assume that the given XML Schema collection consists of the set of schema components SC.

Assume that the lax validation section is constrained with the namespace constraints NS.

For every attribute $a in $sa check:
  a. if the name matches a global attribute declaration $ad in SC constrained by NS
  b. then: validate the attribute $a according to the attribute declaration $ad. If validation fails, raise a validation error, otherwise type the attribute according to $ad.
  c. else if namespace-uri($a) was not part of NS then raise validation error.
  d. else if namespace-uri($a) is part of NS treat the attribute as untyped. Annotate it with the type xs:anySimpleType.

As a consequence of a successful lax validation, every element and global attribute are either guaranteed to be valid according to their global XML Schema constraint with the given name or are considered to be of an unknown, most general type (e.g., xs:anyType for elements and xs:anySimpleType for attributes).

In one aspect, the subject innovation can improve static typing rules that capture the semantics implied by the lax validation rules and the available schema components as constrained by the in-scope schema components and the namespace wildcards. As such, when a path expression with an explicit name test enters into a lax wildcard section, the subject innovation identifies whether the path selects an element or attribute that is known in the static schema context or it selects an element or attribute that is basically considered as any type. Moreover, since a global element or attribute declaration can trigger a validation and thus typing of an element at any level within the lax wildcard section sub tree, the type inference has to carry the information about the accessible global components down the tree. Once a known element or attribute is encountered or hit, that type can be used and the wildcard can be dropped if possible.

In order to resolve a name inside a lax validation section, one particular aspect of the subject innovation can employ namespace wildcard constraints as an additional filter against the statically known XML schema components to ensure absence of names that are disallowed while inferring the static type. According to a further particular aspect, the subject innovation can introduce a name subtraction to the wildcard element. For example:
schema-element({urn:example1}A)|schema-element({urn:example1}B)|element(*-{{urn:example1}A, {urn:example1}B}, xs:anyType)

It is to be appreciated that such approach can require special rules for the subtractions, and hence logically carry around a large amount of subtractions that are to be propagated since the schema-element can appear within the xs:anyType again.

In a related aspect, the annotation component of the subject innovation can annotate the element and attribute wildcards with an optional namespace constraint. Basically elements and attribute wildcards element(*, xs:anyType) and attribute (*, xs:anySimpleType) obtain an additional constraint that indicates the set of namespaces that are used to constrain the wildcard section. Subsequently, a mapping component can perform the mapping as in the first approach, yet employ the namespace constraint. Thus, the type of the example above can be:
schema-element({urn:example1}A)|schema-element({urn:example1}B)|element[NS](*, xs:anyType)
where NS is defined as the set {urn:example1}

NS for attributes and elements can be determined when mapping the schema components to the type system, as explained in detail infra. Such can be based upon following rules:

1. If the namespace wildcard constraint is ## any, a special indicator ##any is used to indicate that all the namespaces that belong to the static in-scope schema components may appear as well as any other namespace, 2. If ##other is specified, the set of all namespaces (##any) minus the target namespace that contains the content model, 3. the set of explicitly specified namespaces of the namespace wildcard constraint, 4. if ##targetNamespace is specified, the target namespace that contains the content model.

5. If the target namespace or the XML Schema collection contains the no namespace or ##local is specified, then the no namespace is identified with ##local in the set.

6. Note that 1 and 2 can be considered open-world namespace constraints, meaning that NS does contain an infinite number of namespace uris beyond the ones contained in the XML Schema collection, while c and d are closed-world and NS only contains namespace uris as explicitly given.

7. The intuition of evaluating step expressions now is that whenever the NS is present, it assumes the following:

I. All the relevant schema components (attribute or element) of the namespaces in NS are checked separately for a match (meaning they are all unioned to this element or allgrouped to the attributes)

II. Any element or attribute step whose targetnamespace is not contained in NS will lead to inferring an empty sequence.

III. Any element or attribute step whose expanded-QName is part of the relevant in-scope schema component will infer the given type.

IV. Any element or attribute step whose targetnamespace matches one of the namespaces in NS, but whose localname does not, will infer element[NS](name, xs:anyType) or attribute[NS](name,xs:anySimpleType) when first entering the wildcard section, and element[##any](name, xs:anyType) in deeper nesting levels within.

Figure 2:
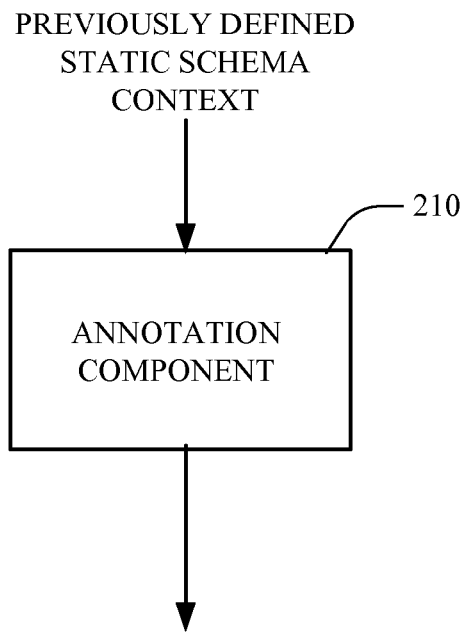
FIG. 2 illustrates an annotation component that supplies type inferencing of path expressions on LAX validation wild card sections.
Figure 3:
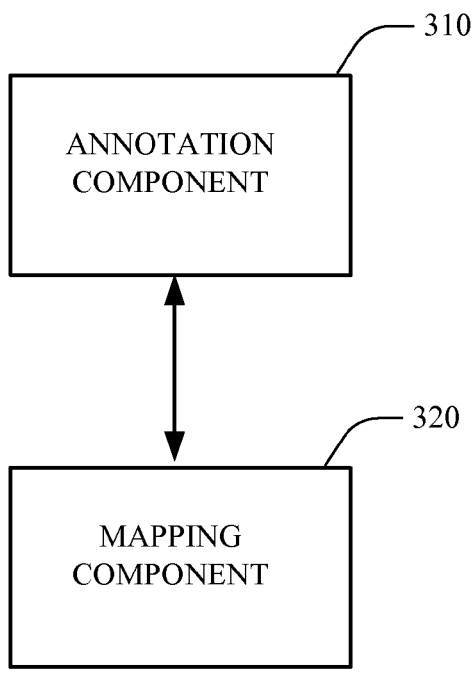
FIG. 3 illustrates a mapping component that interacts with an annotation component according to a particular aspect of the subject innovation.

FIG. 2 and FIG. 3 illustrate an annotation component 210, 310 and a mapping component 320 that facilitate extending static typing rules of W3C with a more precise static typing algorithm that supplies knowledge for types occurring in the Lax validation section. The annotation component 210 can take as input a previously defined static schema context, to supply type inferencing of path expressions on Lax validation wild card sections. Hence, various elements in the schema such as element[{##local}](*, xs:anyType) can be annotated via such annotation component with additional information about the wild card section.

The following are the formal rules following the syntax used by the XQuery Formal Semantics that show mapping via the mapping 320 of the XML Schema component to the XQuery type system. It can be assumed that TGNS is the target namespace URI where the any section is being defined in (##local if it is the no namespace target namespace).

Mapping of the xs:any Wildcard

Typically, the xs:any wildcard can be mapped to the union of all top-level elements allowed by the namespace constraint and the catch all of the element wildcard constrained by the namespace constraint. As such:

```
[ <any
   OccursAttributes
   namespace = NS
   processContents = "lax" >
   annotation?
```

```
</any>
]_content(targetNCName)
==
([NS]_{global-schema-elements} | element[for $n in NS return[$n]_{namespace-uri}]
(*, xs:anyType)
)[OccursAttributes]_{occurs}
```

With the following definitions:

[NS]_{global-schema-elements} == Union (for $ns in expand-NS(NS) return statEnvs.elemDecl($ns:*))

statEnvs.elemDecl($ns:*) returns the list of element declarations for the given name wildcard from the static in-scope element declaration context. And expand-NS( ) is defined as:

```
expand-NS(NS)
==
  for $n in NS
  return
    if $n = ##any then XSC
    else if $n == ##other then XSC-{TGNS}
    else if $n == ##targetNamespace then TGNS
    else if $n == ##local then ''
    else (:if $n == anyURI then:) $n
```

And:
[##any]_{namespace-uri} == ##any
[##other]_{namespace-uri} == ##any - TGNS
[##targetNamespace]_{namespace-uri} == TGNS
[##local]_{namespace-uri} == ##local
[anyURI]_{namespace-uri} == anyURI Mapping of an Element of Type xs:anyType Conventional elements of type xs:anyType are typically mapped to normal elements of type xs:anyType. The subject innovation enables implementing standard semantics with lax validation, and the mapping component can map the element of type xs:anyType in the same way as an xs:any wildcard section, wherein the name of such element is known. Accordingly,

```
[
  <element
    OccursAttributes
    name = NCName
    NillableAttribute
    type = xs:anyType />
]_content(targetNCName)
==
( element [##any] (targetNCName:NCName, xs:anyType
[NillableAttribute]_{nillable})
)[OccursAttributes]_{occurs}
```

Mapping of the xs:anyAttributes Wildcard

The following are the formal rules following the syntax employed by the XQuery Formal Semantics that show the mapping of the XML Schema component to the XQuery type system. It can be assumed that TGNS is the target namespace URI where the anyAttribute section can be defined therein. It is to be appreciated that union of all the global attribute declarations allowed by the namespace constraint is added later during the expansion phase of the containing element.

```
[
  <anyAttributes
    namespace = NS
    processContents = "lax" >
    annotation?
  </anyAttributes>
]_content(targetNCName)
==
attribute[for $n in NS return[$n]_{namespace-uri}] (*, xs:anySimpleType)*
```

Figure 4:
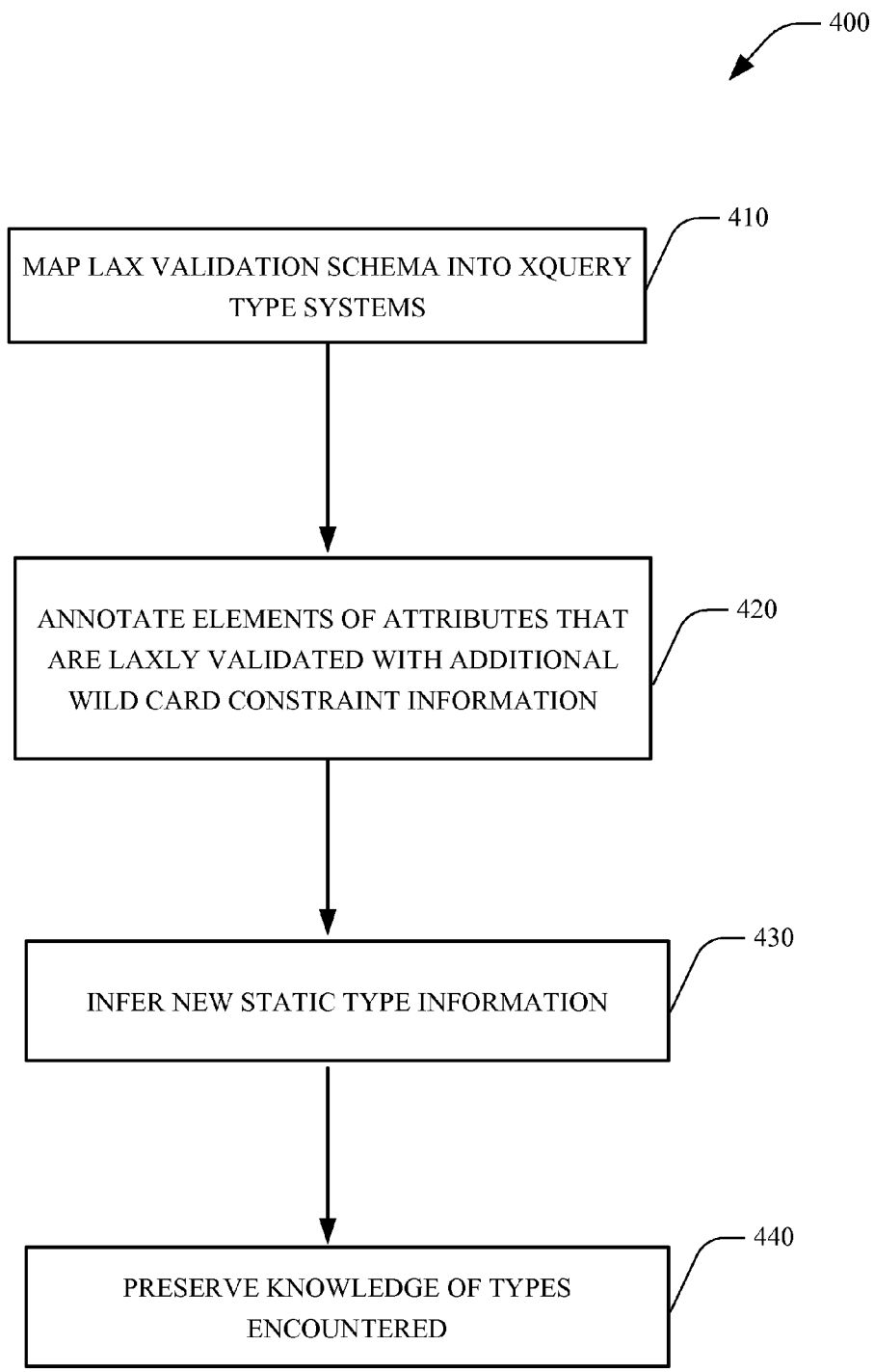
FIG. 4 illustrates a methodology of extending W3C type rules according to an aspect of the subject innovation.

FIG. 4 illustrates a methodology of extending W3C type rules according to an aspect of the subject innovation. While the exemplary method is illustrated and described herein as a series of blocks representative of various events and/or acts, the subject innovation is not limited by the illustrated ordering of such blocks. For instance, some acts or events may occur in different orders and/or concurrently with other acts or events, apart from the ordering illustrated herein, in accordance with the innovation. In addition, not all illustrated blocks, events or acts, may be required to implement a methodology in accordance with the subject innovation. Moreover, it will be appreciated that the exemplary method and other methods according to the innovation may be implemented in association with the method illustrated and described herein, as well as in association with other systems and apparatus not illustrated or described. The methodology 400 provides for an extension to typing rules of W3C, by creating a more precise static typing algorithm that supplies knowledge for types occurring in the Lax validation section. As such, Lax validation can be identified and associated expressions known with particularity. Initially, and at 410 a Lax validation for a schema is mapped into a XQuery type systems. Such mapping can include implementing standard semantics with lax validation, and the element of type xs:anyType can be mapped in the same way as an xs:any wildcard section, wherein the name of such element is known.

Subsequently, and at 420 elements of attributes that are Laxly validated can be annotated with additional wild card constraint information. As such, when an XQuery is received that queries using path expressions into a Lax validation section, the subject innovation can supply type information and type inference rules to infer new static type information at 430. Such can further preserve knowledge of what types can be encountered within a Lax validation section, to enable a more precise inference as compared to W3C rules a 440.

Figure 5:
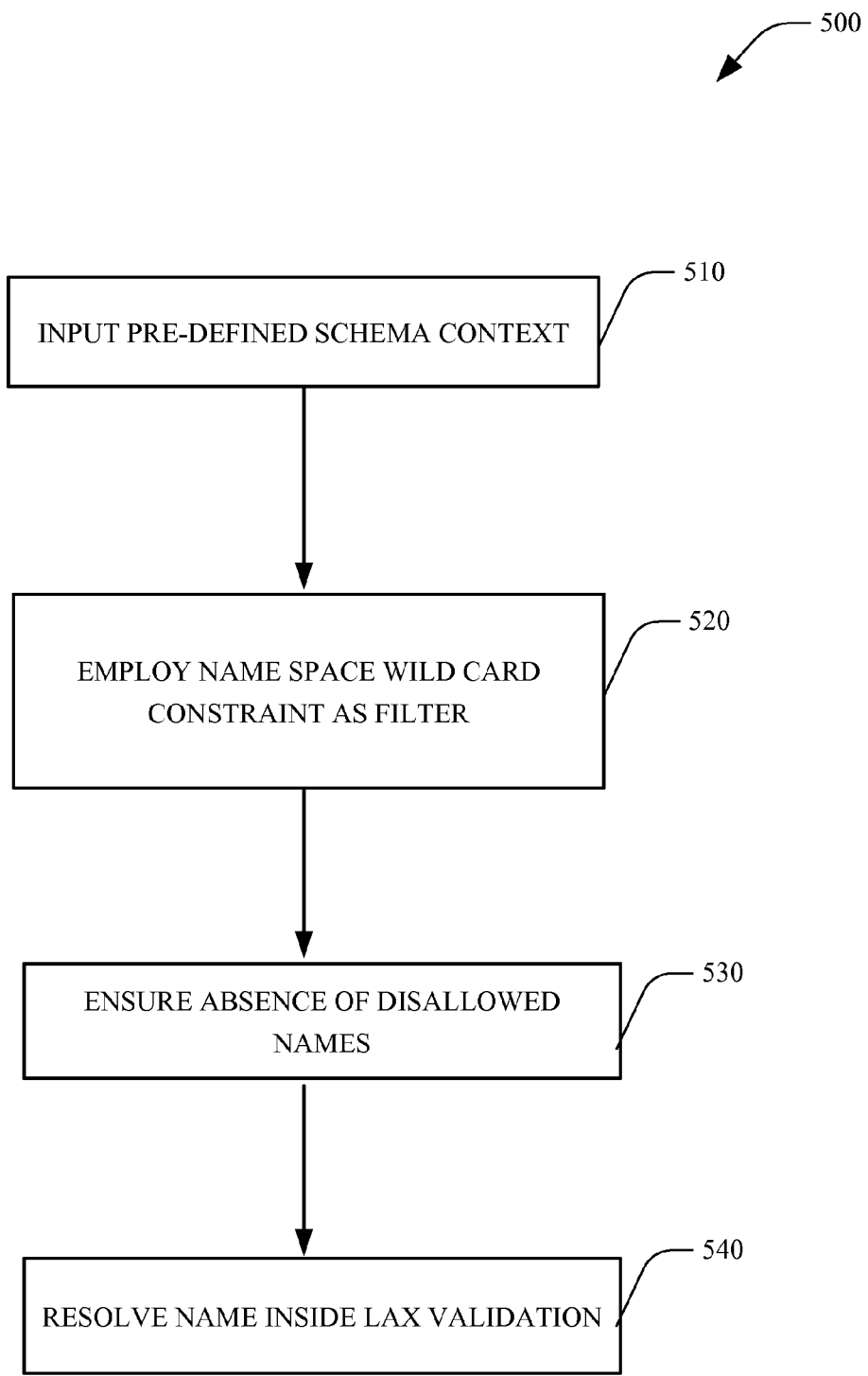
FIG. 5 illustrates a further methodology of annotating of wild card sections with wild card constraints.

FIG. 5 illustrates a related methodology 500 of supplying a more precise static typing as compared to W3C for query languages that query into Lax validation sections of XML documents. As such, when a path expression with an explicit name test enters into a lax wildcard section, the subject innovation identifies whether the path selects an element or attribute that is known in the static schema context or it selects an element or attribute that is basically considered as any type. Initially and at 510, a previously defined static schema context is received as an input. At 520 name space wild card constraint can be employed as filter against the statically know XML schema components. Next and at 530, absence of names disallowed while inferring static type can be ensured as described in detail supra. Subsequently and at 540 a name inside a lax validation section can be resolved.

Figure 6:
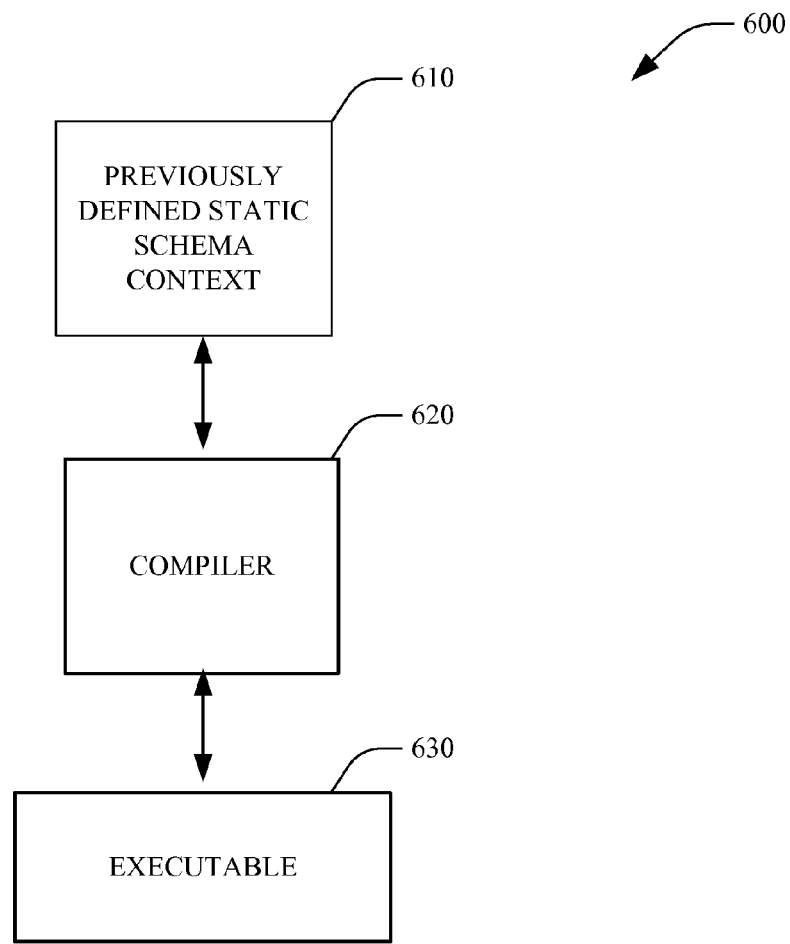
FIG. 6 illustrates a programming environment having a previously defined static schema context to supply a more precise type rule as compared to conventional W3C algorithms.

FIG. 6 illustrates a programming environment 600 having a previously defined static schema context, wherein prior to the subject innovation conventional approaches merely consider all lax elements and attributes to be of the most generic content type (xs:anyType for elements, xs:anySimpleType for attributes); and hence do not provide more exact information. As such, many perfectly legitimate queries typically fail static type checks, because the inferred type is being considered as too broad, and hence rejected. The system 600 enables inference of types for XQuery expressions that navigate down into the Lax validation section, and a more precise type rule is obtained (as compared to conventional W3C algorithms.) For example, by annotating wild card sections with additional wild card constraint information, knowledge of types can be preserved for a subsequent encounter within a Lax validation section. A compiler 620 processes the source program according to well-known compilation techniques to produce executable code 630 for a computer. Such facilitates checking compatibility of types at time when operations are to be performed, with expected types (e.g., a check for numeric types—as opposed to any type—for mathematical operation), wherein expressions can be compiled with knowledge for the types involved, and errors mitigated/optimizations introduced.

In one aspect, upon mapping wildcard sections to the type system, and finding an element or attribute marked with a name space wild card constraint, the type inference can be affected as described in detail below. Typically, most rules can propagate the type with the namespace wildcard constraint. Yet, rules for forward step expressions can exploit annotations to infer more precise types. In particular, the axes and filter steps can be adjusted for the cases where they operate on a namespace wildcard constrained element or attribute.

Self Axis

The self axis rule does not change. As such, element and attribute types with namespace wildcard constraints can be passed through unchanged.

Child Axis

In the case of an element type, the static type of the child axis can be obtained by static name or type lookup in the static element declaration context. (statEnvs.elemDecl) and expansion of the type reference to the resulting type (including the necessary adjustment), and the extraction of the types which are not attributes (e.g., the content type). Typically, extraction allows any comments and processing-instructions to be interleaved with the actual schema types. If the element type is marked with a namespace wildcard constraint, then one can assume that a lax validation section has been entered, wherein every step can be applied to every part of the union and that the inference is performed according to the general rules on all of the unmarked elements.

Changes to Static Type Lookup

Initially, one has to extend the static type lookup to ensure that the wildcard constraint is returned on global elements of type xs:anyType. For example, the In-scope schema definitions (ISSD) contains the following declarations (using XQuery SequenceType syntax):

```
define element[{##any}]((e4, xs:anyType)
define element(e5, eT5)
define type eT5 {
    element (a, aT),
    element[{##local}](*, xs:anyType),
    element (b, bT)+,
    (element (c, cT) | element (d,dT)?)}
```

Then the static type lookup of element e4 can supply no Nillable indication and the type reference xs:anyType and the namespace wildcard constraint {##any}. On the other hand, the static type lookup of element e5 can supply no Nillable indication and the type reference eT5 and no namespace wildcard constraint.

Changes to Expansion Phase

Subsequently, it can be required to augment the Expansion phase rules. Basically, one needs to expand the attribute part of an element with an attribute having an attribute wildcard card constraint to include all the optional global attributes of the in-scope schema components of the given XML Schema collection subject to the namespace constraint plus the catchall. Such can indicate additions to the all group of all specified attributes the all group. $[NS]_{global\text{-}schema\text{-}attributes}$ where NS is the namespace wildcard constraint on the anyAttributes section (the catch all is already there). Note that the BuiltInAttributes of the xsi namespace still get type checked according to their types.

Definition:

```
[NS]_{global-schema-attributes} == AllGroup (
    for $ns in expand-NS(NS)
        , $t in statEnvs.attrDecl($ns:*)
        return $t?
)
```

And when one extends content part of an element with an element namespace wildcard constraint—then one can include all global elements of the in-scope schema components of the given XML Schema collection subject to the namespace constraint plus the catch-all. The "catch all" is ##any since the XML Schema validation rule does not typically provide for a restriction of the namespaces at deeper nesting levels. Accordingly, any of the any sections within the element will be mapped to the already familiar

```
[ element [NS] (QName, xs:anyType NillableAttribute) )
OccursAttributes]_{extend}
==
([NS]_{global-schema-elements} | element[##any] (*, xs:anyType NillableAttribute)
)OccursAttributes
```

It is to be appreciated that in alternative approach mapping can also be performed from NS to ##any for deeper levels as part of the name filters.

Changes to Child Axis Filter

The rule variable NS denotes the namespace wildcard constraint. The semantics of the rule about "child axis filter on elements with simple content type" of the XQuery Formal Semantics recommendation remains unaffected by the lookup and extension phase changes.

In case of an element type with complex content type, the static type of child axis is obtained by static type lookup and expansion of the type, then the extraction of the content type. It is assumed that in case of expansion of the complex content type, one obtains all the comments and processing-instructions added to the element and text node content models.

Rule EXP-C1 "child axis filter on elements with complex and empty content type":

```
If:     static type lookup of ElementType gives optional NS, optional
        Nillable and TypeReference
        and optional NS, optional Nillable and TypeReference expands to
        (AttributeType, ChildType)
        and ChildType <: node*
Then:   applying the filter child:: on ElementType yields type ChildType
```

If the element's type allows mixed content, a Child Type is obtained that is a union of either xdt:anyAtomicType* and the original type expanded with text nodes and PIs and comments. Thus, neither of previous rules can apply and the following third rule can be introduced:

Rule EXP-C2 "child axis filter on elements with mixed content type":

```
If:     static type lookup of ElementType gives optional NS, optional
        Nillable and TypeReference
        and optional NS, optional Nillable and TypeReference expands to
        (AttributeType, ChildType)
        and not(ChildType <: node*) and not(ChildType
        <: xdt:anyAtomicType*)
        and ChildType = ComplexType | xdt:anyAtomicType*
Then:   applying the filter child:: on ElementType yields type
ComplexType | ((comment? & processing-instruction?)*, text?)
```

Finally, if the element's type allows either simple or complex content type via xs:anyType, it is required to expand the original type with the namespace wildcard constraints and with text nodes (e.g., the type inferred by the child axis filter can be (pi? & comment? & element of type xs:anyType? & text?)*). Hence typically, the previous rules do not apply and the following rule can be introduced:

Rule EXP-C3 "child axis filter on elements with any-typed content type":

```
If:     static type lookup of ElementType gives optional NS, optional
        Nillable and TypeReference
        and optional NS, optional Nillable and TypeReference expands to
        (AttributeType, ChildType)
        and TypeReference = xs:anyType
Then:   applying the filter child:: on ElementType yields type
(comment? & processing-instruction? & ChildType? & text?)*
```

It is noted that the ChildType already contains expansions with comments and processing-instructions and in all three cases includes the expansions due to the namespace wildcard constraint. All the other child axis filter rules stay the same.

Attribute Axis

In case of an element type, the static type of the attribute axis is obtained by static type lookup and expansion of the resulting type and extractions of the attribute types. Rule EXP-A1 "attribute axis filter on elements":

```
If:     static type lookup of ElementType gives optional NS, optional
        Nillable and TypeReference
        and optional NS, optional Nillable and TypeReference expands to
        (AttributeType, ChildType)
Then:   applying the filter attribute:: on ElementType yields type
AttributeType
```

Again expansion can expand the AttributeType with the top-level attribute types allowed by the attribute wildcard section if the element type contains an attribute namespace wildcard. All the other attribute axis filter rules can remain the same.

Parent Axis

Since such improvement does not typically improve the static inference for parent axis, the rules do not change in general. Note that the element of type xs:anyType is not typically constrained by a namespace wildcard section. Therefore, all the parent axis inference rules can remain the same.

Descendant Axis

The descendant axis is a depth-first application of the child axis on all the descendant nodes until all leaf nodes have been reached. Inferring a precise static type is complex in the non-recursive case (we would need to make sure that the structure of the inferred type expression is correctly reflecting the structure of the depth-first traversal of the descendants) and impossible in the case of a recursive schema (we would get an endless recursive type). Therefore the type inference infers the prime( )*occ( ) of all the types that we can find going down the child descendants (including text, pi and comments as provided by the child axes). Recursions don't have to be followed, since the prime type factorization already has all the types that we could detect by following the recursion.

Since the descendant axis can not readily indicate whether the final step is selecting a global or local element inside a namespace wildcard section, a union of both can be inferred. Also, a descendant axis can encounter a variety of elements with different namespace wildcard constraints. Nonetheless, since any descendant axes delves into deeper nesting levels of a wildcard section, one can preserve one element wildcard section of the form element[##any] (*, xs:anyType NillableAttribute)) as part of the prime( ) type.

For example:

```
Type:
define element(b, bT)
define type bT {
  element(e, xs:int)*
}
define element(e, eT)
define type eT {
  element(a, xs:string),
  element[{##local}](*, xs:anyType)?
} Instance documents ($dx points to document node containing
XML document):
$d1:
<e><a>L1</a><e><a>L11</a><e><a>L111</a></e></e></e>
$d2:
<e><a>L1</a><e><a>L11</a><e><a>L111</a><b><e>42</e></e></e>
</e>
$d1/descendant::e will infer: (element(e, eT) | element(e, xs:int))*
Since the element[{##local}](*,xs:anyType) cannot contain another
element e of the same namespace.
$d1/descendant::*:e will infer the same.
If the type eT looks like:
define type eT {
  element(a, xs:string),
  element[{##any}](*, xs:anyType)?
}
```

$d1/descendant::e will still infer: (element(e, eT)|element(e, xs:int))*Even if one of the other schemas would contain a local unqualified element name, that name would be added to the inference, but the catch all would not be needed. $d1/descendant::*:e will infer: element(e, eT)|element(e, xs:int) |element[{##any}](*:e, xs:anyType))* since there can be elements from other namespaces with local name e. As explained earlier, the subject innovation enables annotation of the element (*, xs:anyType)? with additional information about the wild card section.

Descendant-or-Self-Axis

Such rule does not change.

Changes to Node Test Filters

Upon extending the wildcard section, all the added element and attribute types can be addressed by the normal filter rules. However, a special filter can be applied when one encounters a namespace wildcard constrained element or attribute type. Typically, the Rules below follow a syntax of the conventional static typing specification. The sequence type notation that is used above of the form:

element[NS](ElementName, TypeReference Nillable? Type reference, where nillable? maps to the form.

element ElementName NS Nillable? TypeReference that is used below.

Principle Node Kind Element

The first rule merely checks if the element type actually has the name of the filter and if so, returns the element. If the name of the element can be matched even if the namespace wildcard constraint is present, the result of the filter can match the element type; e.g., if the element type is element[{##any}] (foo, bar) and the filter is (element, foo)—then the element type can be inferred. Note that one can obtain such element type by either an explicit declaration of the element foo to be of type xs:anyType; or by inferring it as part of a query into a laxly validated content model. Thus, in general one needs to expand the rule slightly to match on elements with the namespace wildcard:

Rule FIL-E1 "(element, QName) filter on element node with name":

```
If:    ElementType is of the form element ElementName NS? Nillable?
       TypeReference
       and expand(QName) = expand(ElementName)
Then:applying the filter (element, QName) on ElementType yields type
       ElementType
```

It is to be appreciated that every time a namespace constraint NS is part of the element type, the type reference can be xs:anyType, and Nillable is true for this and all subsequent rules on name filters on element nodes. The next rule checks if the element type has no name (since the element may have been created with a dynamic name, or there existed an untyped document or a type inference lost the name). If no name existed, then either an element with that name exists with the type of the element, or it does not exist. If a namespace constraint is present, then the constraint is to be checked. In general, if any of the namespaces allowed by the constraint are defined in the in-scope-schema components—as defined by the XML Schema collection associated with the document defining an element of the given name—then, this filter has been satisfied more precisely elsewhere and thus this rule can infer empty. In all other cases, (where the namespace matches but the name does not, or neither is matching but the namespace is allowed), the type gets exposed with the name added and carrying on the namespace constraint.

Rule FIL-E2 "(element, QName) filter on element node without name and namespace constraint":

```
If:   ElementType is of the form element   NS   Nillable? TypeReference
      and expand(QName) = QName(URI, NCName1)
      and not(statEnvs.elemDecl(expand(QName)))
      and ( URI in expand-NS(NS)
         or NS = ##any
         or NS = ##other and URI  != TGNS)
Then: applying the filter (element,  QName) on ElementType yields
      type (element  QName  NS Nillable TypeReference)?
```

Several rules below perform the checks above for the case where one does not have a QName as filter but a QName wildcard. Rule FIL-E3 "(element, QName) filter on element node with name *:NCName and namespace constraint":

```
If:   ElementType is of the form element   * : NCName  NS Nillable
      TypeReference
      and expand(QName) = QName(URI, NCName1)
      and NCName = NCName1
      and not(statEnvs.elemDecl(expand(QName)))
      and ( URI in expand-NS(NS)
         or NS = ##any
         or NS = ##other and URI  != TGNS)
Then:applying the filter (element,  QName) on ElementType yields
      type element  QName  NS Nillable TypeReference
```

Rule FIL-E4 "(element, QName) filter on element node with name NCName:* and namespace wildcard constraint":

```
If:  ElementType is of the form element  NCName : *  NS Nillable
       TypeReference
     and expand(QName) = QName(URI, NCName1)
     and statEnv.namespace(NCName) = URI
     and not(statEnvs.elemDecl(expand(QName)))
     and ( URI in expand-NS(NS)
         or NS = ##any
         or NS = ##other and URI  != TGNS)
Then:applying the filter (element,  QName) on ElementType yields
     type element  QName  NS Nillable TypeReference
```

The following rules perform the checks above for the case where one does not have a QName as filter but a QName wildcard. Initially, one can check for the *:NCName case. If the element with the wildcard constraint has a given name, then it can be permitted with the given name and propagate the wildcard constraint Rule FIL-E5 "(element, *:NCName) filter on element node with name and namespace wildcard constraint":

```
If:  ElementType is of the form element ElementName NS Nillable
       TypeReference
     and expand(ElementName) = QName(URI, NCName1)
     and NCName = NCName1
Then:applying the filter (element,  *:NCName) on ElementType
     yields type
       ElementType
```

If a namespace wildcard constraint is encountered, one can return either *:NCName for the given name if the namespace wildcard is open (##any, ##other), or a wildcard for everyone of the explicitly allowed namespace URIs with the given name assuming that that name has not been found. The union can then collapse it into a single element[{##all}](*:NC-Name, xsanyType)?. Note that one can infer a more complex union of all names from the namespaces allowed that have not a more precise definition.

Rule FIL-E6 "(element, *:NCName) filter on element node without name and open namespace wildcard constraint":

```
If:  ElementType is of the form element NS Nillable TypeReference
     and (NS = ##any or NS = ##other)
Then:applying the filter (element,  *:NCName) on ElementType yields
     type (element  *:NCName  NS Nillable TypeReference)?
```

Rule FIL-E7 "(element, *:NCName) filter on element node without name and closed namespace wildcard constraint":

```
If:  ElementType is of the form element  NS Nillable TypeReference
     and not(NS = ##any or NS = ##other)
Then:applying the filter (element,  *:NCName) on ElementType yields
     type UNION(for each $ns in expand-NS(NS)
           where not(statEnvs.elemDecl(expand($ns:NCName)))
           return element  *:NCName  NS Nillable TypeReference)?)
```

Rule FIL-E8 "(element, *:NCName) filter on element node with name *:NCName and open namespace wildcard constraint":

```
If:  ElementType is of the form element  * : NCName1 NS Nillable
       TypeReference
     and NCName = NCName1
     and (NS = ##any or NS = ##other)
Then:applying the filter (element,  *:NCName) on ElementType yields
     type
       ElementType
```

Rule FIL-E9 "(element, *:NCName) filter on element node with name *:NCName and closed namespace wildcard constraint":

```
If:  ElementType is of the form element  * : NCName1 NS Nillable
       TypeReference
     and NCName = NCName1
     and not(NS = ##any or NS = ##other)
Then:applying the filter (element,  *:NCName) on ElementType yields
     type
       UNION(for each $ns in expand-NS(NS)
             where not(statEnvs.elemDecl(expand($ns:NCName)))
             Return element  *:NCName  NS Nillable TypeReference)?)
```

The following rule manages a name test filter where the name is given and all namespaces can be employed against an element node with a namespace wildcard constraint that has the namespace uri preserved but no name. The namespace uri on that element is in the allowed set of namespaces of the namespace wildcard constraint, since otherwise validation would have rejected the element.

Moreover, to ensure that the local name has not been covered by one of the globally declared elements; the following rule can further be added: Rule FIL-E10 "(element, *:NCName) filter on element node with name NCName:* and namespace wildcard constraint":

```
If:  ElementType is of the form element NCName1 : * NS Nillable
       TypeReference
     and not(statEnvs.elemDecl(expand(NCName1:NCName)))
Then:applying the filter (element,  *:NCName) on ElementType yields
     type (element  NCName1:NCName  NS Nillable TypeReference)?
```

The next additional rules check for the NCName:* case where the element has a namespace wildcard. As explained earlier, if the element node name has already a name space, one can assume that it is part of the allowed namespace constraint due to the validation guarantee that no other namespace is allowed. Likewise, when there is no name, it can be ensured that the namespace is allowed.

Rule FIL-E11 "(element, NCName:*) filter on element node with name and namespace wildcard constraint":

```
If:  ElementType is of the form element ElementName NS Nillable
       TypeReference
     and expand(ElementName) = QName(URI, NCName1)
     and statEnv.namespace(NCName) = URI
     and not(statEnvs.elemDecl(expand(ElementName)))
Then:applying the filter (element,  NCName:*) on ElementType yields
     type
       ElementType
```

Rule FIL-E12 "(element, NCName:*) filter on element node without name and namespace wildcard constraint":

```
If:   ElementType is of the form element   NS Nillable TypeReference
      and (statEnv.namespace(NCName) in expand-NS(NS)
         or NS = ##any
         or NS = ##other and statEnv.namespace(NCName) != TGNS)
Then:applying the filter (element,  NCName:*) on ElementType yields
      type (element   NCName:*   NS Nillable TypeReference)?
```

Rule FIL-E13 "(element, NCName:*) filter on element node with name *:NCName and namespace wildcard constraint":

```
If:   ElementType is of the form element   * : NCName1 NS Nillable
      TypeReference
      and not(statEnvs.elemDecl(expand(NCName:NCName1)))
      and (statEnv.namespace(NCName) in expand-NS(NS)
         or NS = ##any
         or NS = ##other and statEnv.namespace(NCName) != TGNS)
Then:applying the filter (element,  NCName:*) on ElementType yields
      type (element   NCName:NCName1   NS Nillable TypeReference)?
```

Rule FIL-E14 "(element, NCName:*) filter on element node with name NCName:* and namespace wildcard constraint":

```
If:   ElementType is of the form element NCName1 : * NS Nillable
      TypeReference
      and statEnv.namespace(NCName) = statEnv.namespace(NCName1)
      and (statEnv.namespace(NCName) in expand-NS(NS)
         or NS = ##any
         or NS = ##other and statEnv.namespace(NCName) != TGNS)
Then:applying the filter (element,  NCName:*) on ElementType yields
type
      ElementType
```

In case of the general wildcard, one can preserve the type regardless of whether the element type had a name or not and propagate the namespace wildcard constraint if present. Thus the existing rule can be maintained. Hence, Rule "(element,*) filter on element node". Similarly, other rules on other node types do not change either.

Principle Node Kind Attribute

Substantially similar rules apply if the principle node kind is "attribute". However, since the attribute namespace wildcard constraint is not being propagated down, one typically does not require to preserve it in its inference. As explained earlier, again it can be assumed that matching any globally known attribute has been added in the expansion phase and is otherwise checked. Accordingly, they can be excluded as described below. It is to be appreciated that the TypeReference can typically refer to xs:anySimpleType with namespace constraints.

Accordingly, the first rule just can check if the attribute type actually has the name of the filter and if so, returns the attribute type under an assumption that the globally known attributes are checked elsewhere.

Rule FIL-A1 "(attribute, QName) filter on attribute node with name and namespace wildcard constraint":

```
If:   AttributeType is of the from attribute AttributeName NS
      TypeReference
      and expand(QName) = expand(AttributeName) = QName(URI, Name)
      and not(statEnvs.attrDecl(expand(QName)))
      and (URI in expand-NS(NS)
         or NS = ##any
         or NS = ##other and URI != TGNS)
Then:applying the filter (attribute,  QName) on AttributeType yields type
      attribute AttributeName TypeReference
```

The next rule can check if the attribute type has no name. If there existed no name, then either an attribute with that name exists with the type of the attribute, or it does not exist. Again one can infer empty if the namespace of the filter is not allowed by the namespace wildcard constraint or already exists globally.

Rule FIL-A2 "(attribute, QName) filter on attribute node without name and namespace wildcard constraint":

```
If:   AttributeType is of the form attribute NS TypeReference
      and expand(QName) = QName(URI, Name)
      and not(statEnvs.attrDecl(expand(QName)))
      and (URI in expand-NS(NS)
         or NS = ##any
         or NS = ##other and URI != TGNS)
Then:applying the filter (attribute,  QName) on AttributeType yields
      type (attribute   QName   TypeReference)?
```

Moreover, later rules below perform the checks above for the case where one does not have a QName on the node but a QName wildcard. Since they infer wildcards, one has to add rules for filtering on an attribute type that contains such wildcards and have to take the namespace wildcard constraints into account. As in the element case, if one can infer a complete name, one will have to apply such rules only if the name does not match a globally declared attribute and one does not have to check for the namespace to be allowed by the namespace wildcard constraint.

Rule FIL-A3 "(attribute, QName) filter on attribute node with name *:NCName and namespace wildcard constraint":

```
If:   AttributeType is of the form attribute * : NCName NS TypeReference
      and expand(QName) = QName(URI, NCName1)
      and NCName = NCName1
      and not(statEnvs.attrDecl(expand(QName)))
      and (URI in expand-NS(NS)
         or NS = ##any
         or NS = ##other and URI != TGNS)
Then:applying the filter (attribute, QName) on AttributeType yields
      type attribute QName TypeReference
```

Rule FIL-A4 "(attribute, QName) filter on attribute node with name NCName:* and namespace wildcard constraint":

```
If:   AttributeType is of the form attribute NCName : * NS TypeReference
      and expand(QName) = QName(URI, NCName1)
      and statEnv.namespace(NCName) = URI
      and not(statEnvs.attrDecl(expand(QName)))
      and (URI in expand-NS(NS)
         or NS = ##any
         or NS = ##other and URI != TGNS)
Then:applying the filter (attribute, QName) on AttributeType yields
      type attribute QName TypeReference
```

In addition, the following rules perform checks above for the case wherein one does not have a QName as filter but a QName wildcard. Since wild cards are inferred wildcards, one can add rules for filtering on an attribute type that contains such wildcard; and has to take the namespace wildcard constraints into account. As in the element case, if one can infer a complete name, one can further apply such rules only if the name does not match a globally declared attribute; and one has to check for the namespace to be allowed by the namespace wildcard constraint. First one can check for the *:NCName case.

Rule FIL-A5 "(attribute, *:NCName) filter on attribute node with name and namespace wildcard constraint":

```
If:  AttributeType is of the form attribute AttributeName
     NS TypeReference
     and expand(AttributeName) = QName(URI, NCName1)
     and NCName = NCName1
     and not(statEnvs.attrDecl(expand(AttributeName)))
     and (URI in expand-NS(NS)
        or NS = ##any
        or NS = ##other and URI != TGNS)
Then:applying the filter (attribute, *:NCName) on AttributeType
     yields type attribute AttributeName TypeReference
```

If the attribute node to be checked has no name given or has a wildcard for its attribute name, one can infer a wildcard of xs:anyType in the case that the namespace wildcard constraint is closed. Otherwise, one can infer the wildcard—wherein one can infer an all group for all the known namespaces in the closed case for the attributes for which no global definition exists.

Rule FIL-A6 "(attribute, *:NCName) filter on attribute node without name and closed namespace wildcard constraint":

```
If:  AttributeType is of the form attribute NS TypeReference
     and not(NS = ##any or NS = ##other)
     and some $ns in expand-NS(NS) satisfies
        not(statEnvs.attrDecl(expand($ns:NCName)))
Then:applying the filter (attribute, *:NCName) on AttributeType yields
     type (attribute *:NCName TypeReference)?
```

It is to be appreciated that such rule can be written as FIL-A6alt if one desires to preserve the all group of all the names.

Rule FIL-A6alt "(attribute, *:NCName) filter on attribute node without name and closed namespace wildcard constraint":

```
If:  AttributeType is of the form attribute NS TypeReference
     and not(NS = ##any or NS = ##other)
Then:applying the filter (attribute, *:NCName) on AttributeType yields
     type ALLGROUP(for each $ns in expand-NS(NS)
        where not(statEnvs.attrDecl(expand($ns:NCName)))
        return (attribute $ns:NCName TypeReference)?)
```

Rule FIL-A7 "(attribute, *:NCName) filter on attribute node without name and open namespace wildcard constraint":

```
If:  AttributeType is of the form attribute NS TypeReference
     and (NS = ##any or NS = ##other)
Then:applying the filter (attribute, *:NCName) on AttributeType yields
     type (attribute *:NCName TypeReference)?
```

Rule FIL-A8 "(attribute, *:NCName) filter on attribute node with name *:NCName and closed namespace wildcard constraint":

```
If:  AttributeType is of the form attribute * : NCName1 NS
     TypeReference
     and NCName = NCName1
     and not(NS = ##any or NS = ##other)
     and some $ns in expand-NS(NS) satisfies
        not(statEnvs.attrDecl(expand($ns:NCName)))
Then:applying the filter (attribute, *:NCName) on AttributeType yields
     type (attribute *:NCName TypeReference)?
```

It is to be appreciated that such rule can be written as FIL-A8alt if one desires to preserve the all group of all the names:

Rule FIL-A8alt "(attribute, *:NCName) filter on attribute node with name *:NCName and closed namespace wildcard constraint":

```
If:  AttributeType is of the form attribute * : NCName1 NS
     TypeReference
      and NCName = NCName1
      and not(NS = ##any or NS = ##other)
Then:applying the filter (attribute, *:NCName) on AttributeType yields
     type ALLGROUP(for each $ns in expand-NS(NS)
        where not(statEnvs.attrDecl(expand($ns:NCName)))
        return (attribute $ns:NCName TypeReference)?)
```

Rule FIL-A9 "(attribute, *:NCName) filter on attribute node with name *:NCName and open namespace wildcard constraint":

```
If:  AttributeType is of the form attribute * : NCName1 NS
     TypeReference
      and NCName = NCName1
      and (NS = ##any or NS = ##other)
Then:applying the filter (attribute, *:NCName) on AttributeType yields
     type (attribute *:NCName TypeReference)?
```

Likewise, the following rule(s) can preserves prefix from the input and adds the name from the filter. As in the element case, one already has inferred a more precise type if the name exists as a global declaration.

Rule FIL-A10 "(attribute, *:NCName) filter on attribute node with name NCName:* and namespace wildcard constraint":

```
If:  AttributeType is of the form attribute NCName1 : * TypeReference
     and not(statEnvs.attrDecl(expand(NCName:NCName1)))
     and (statEnv.namespace(NCName) in expand-NS(NS)
        or NS = ##any
        or NS = ##other and statEnv.namespace(NCName) != TGNS)
Then:applying the filter (attribute, *:NCName) on AttributeType yields
     type (attribute NCName1:NCName TypeReference)?
```

Subsequently, one can heck for the NCName:* case. Again in this case, if the attribute node name has already a name space, it can be assumed that it is part of the allowed namespace constraint due to the validation guarantee that no other namespace is allowed. Moreover, no name exists, and one has ensure that the namespace is allowed.

Rule FIL-A11 "(attribute, NCName:*) filter on attribute node with name and namespace wildcard constraint":

```
If:   AttributeType is of the form attribute AttributeName NS
         TypeReference
         and expand(AttributeName) = QName(URI, NCName1)
         and statEnv.namespace(NCName) = URI
         and not(statEnvs.attrDecl(expand(AttributeName)))
Then:applying the filter (attribute, NCName:*) on AttributeType yields
         type attribute AttributeName TypeReference
```

Rule FIL-A12 "(attribute, NCName:*) filter on attribute node without name and namespace wildcard constraint":

```
If:   AttributeType is of the form attribute NS TypeReference
         and (statEnv.namespace(NCName) in expand-NS(NS)
             or NS = ##any
             or NS = ##other and statEnv.namespace(NCName) != TGNS)
Then:applying the filter (attribute, NCName:*) on AttributeType yields
         type (attribute NCName:* TypeReference)?
```

Rule FIL-A13 "(attribute, NCName:*) filter on attribute node with name *:NCName and namespace wildcard constraint":

```
If:   AttributeType is of the form attribute * : NCName1 NS
         TypeReference
         and not(statEnvs.attrDecl(expand(NCName:NCName1)))
         and (statEnv.namespace(NCName) in expand-NS(NS)
             or NS = ##any
             or NS = ##other and statEnv.namespace(NCName) != TGNS)
Then:applying the filter (attribute, NCName:*) on AttributeType yields
         type (attribute NCName:NCName1 TypeReference)?
```

Rule FIL-A14 "(attribute, NCName:*) filter on attribute node with name NCName:*":

```
If:   AttributeType is of the form attribute NCName1 : * NS
         TypeReference
         and statEnv.namespace(NCName) = statEnv.namespace(NCName1)
         and (statEnv.namespace(NCName) in expand-NS(NS)
             or NS = ##any
             or NS = ##other and statEnv.namespace(NCName) != TGNS)
Then:applying the filter (attribute, NCName:*) on AttributeType yields
         type attribute NCName:* TypeReference
```

Moreover, in case of the general wildcard, one preserve the type and do not care about whether the attribute type had a name or not. However, one can still drop the NS constraint and thus change the rule of the original static typing specification as follows:

Rule FIL-A15 "(attribute,*) filter on attribute node":

```
If:   AttributeType is of the form attribute AttributeName? NS?
         TypeReference?
Then:applying the filter (attribute, *) on AttributeType yields
         type attribute AttributeName? TypeReference?
```

Figure 7:
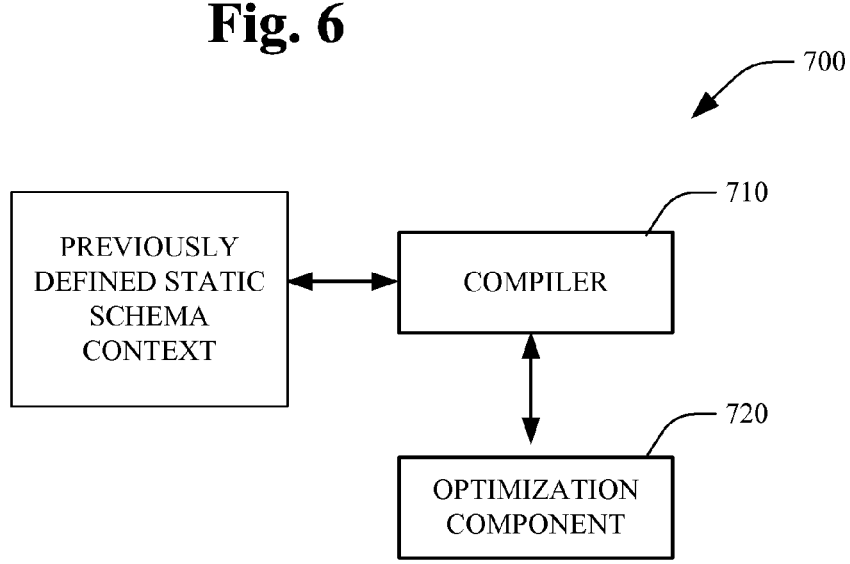
FIG. 7 illustrates a system that employs an optimization component that has knowledge regarding the types involved.

FIG. 7 illustrates a system 700 that employs an optimization component that has knowledge regarding the types involved. Since types can be inferred for XQuery expressions that navigate down into the Lax validation section, and a more precise type rule is obtained—then errors can be mitigated. Hence, compatibility can be checked for types at time when operations are to be performed, such as checking for numeric types when performing a mathematical operation—as opposed to any types. Moreover, when an XQuery is received that queries using path expressions into a Lax validation section, the optimization component can receive inferred new static based on type information and type inference rules. Hence, the optimization component can utilize preserved knowledge of what types can be encountered within a Lax validation section, to enable a more precise inference as compared to W3C rules.

Figure 8:
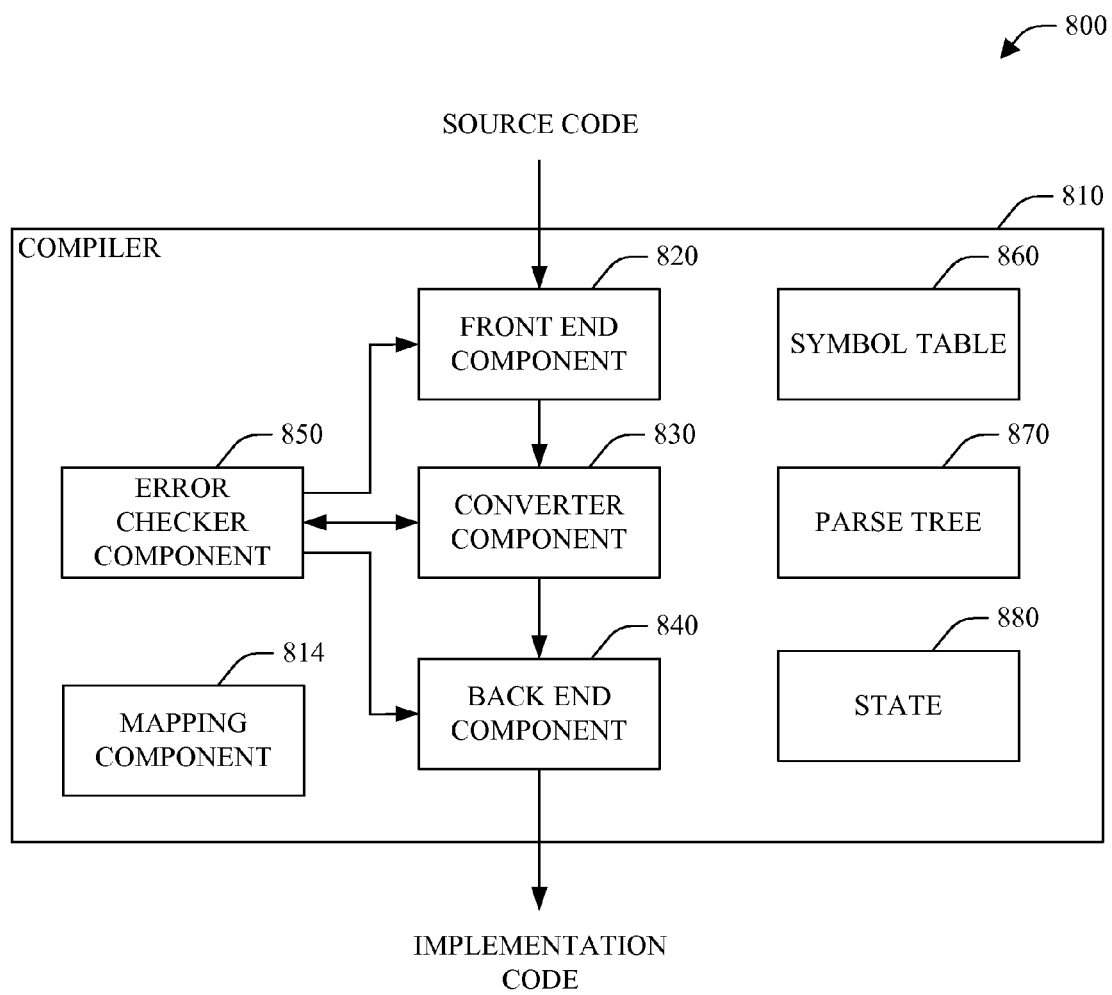
FIG. 8 is a block diagram depicting a compiler environment that can be utilized to implement type inferencing of path expressions on Lax validation wild card sections.

FIG. 8 is a block diagram depicting a compiler environment 800 that can be utilized to implement replacement of constants with expressions of the subject innovation. The compiler environment 800 includes a compiler 810 including a mapping component 814, a front-end component 820, a converter component 830, a back-end component 840, an error checker component 850, a symbol table 860, a parse tree 870, and state 880. The compiler 810 accepts source code as input and can produce implementation code as output. The input can include but is not limited to programmatic expressions as described herein. The relationships amongst the components and modules of the compiler environment illustrate the main flow of data. Other components and relationships are not illustrated for the sake of clarity and simplicity. Depending on implementation, components can be added, omitted, split into multiple modules, combined with other modules, and/or other configurations of modules.

The compiler 810 can accept as input a file having source code associated with processing of a sequence of elements. The source code may include various expressions and associated functions, methods and/or other programmatic constructs. The compiler 810 can process source code in conjunction with one or more components for analyzing constructs and generating or injecting code.

A front-end component 820 reads and performs lexical analysis upon the source code. In essence, the front-end component 820 reads and translates a sequence of characters (e.g., alphanumeric) in the source code into syntactic elements or tokens, indicating constants, identifiers, operator symbols, keywords, and punctuation among other things.

The converter component 830 parses the tokens into an intermediate representation. For instance, the converter component 830 can check syntax and group tokens into expressions or other syntactic structures, which in turn coalesce into statement trees. Conceptually, these trees form a parse tree 870. Furthermore and as appropriate, the converter module 830 can place entries into a symbol table 830 that lists symbol names and type information used in the source code along with related characteristics.

A state 880 can be employed to track the progress of the compiler 810 in processing the received or retrieved source code and forming the parse tree 870. For example, different state values indicate that the compiler 810 is at the start of a class definition or functions, has just declared a class member, or has completed an expression. As the compiler progresses, it continually updates the state 880. The compiler 810 may partially or fully expose the state 880 to an outside entity, which can then provide input to the compiler 810.

Based upon constructs or other signals in the source code (or if the opportunity is otherwise recognized), the converter component 830 or another component can inject code corresponding to facilitate efficient and proper execution. Rules coded into the converter component 830 or other component indicates what must be done to implement the desired functionality and identify locations where the code is to be injected or where other operations are to be carried out. Injected code typically includes added statements, metadata, or other elements at one or more locations, but this term can also include changing, deleting, or otherwise modifying existing source code. Injected code can be stored as one or more templates or in some other form. In addition, it should be appreciated that symbol table manipulations and parse tree transformations can take place.

Based on the symbol table 860 and the parse tree 870, a back-end component 840 can translate the intermediate representation into output code. The back-end component 840 converts the intermediate representation into instructions executable in or by a target processor, into memory allocations for variables, and so forth. The output code can be executable by a real processor, but output code that is executable by a virtual processor can also be provided.

Furthermore, the front-end component 820 and the back end component 840 can perform additional functions, such as code optimization, and can perform the described operations as a single phase or in multiple phases. Various other aspects of the components of compiler 810 are conventional in nature and can be substituted with components performing equivalent functions. Additionally, at various stages during processing of the source code, an error checker component 850 can check for errors such as errors in lexical structure, syntax errors, and even semantic errors. Upon detection error, checker component 850 can halt compilation and generate a message indicative of the error.

As used in herein, the terms "component," "system" and the like are intended to refer to a computer-related entity, either hardware, a combination of hardware and software, software or software in execution. For example, a component can be, but is not limited to being, a process running on a processor, a processor, an object, an instance, an executable, a thread of execution, a program and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance or illustration. Any aspect or design described herein as "exemplary" is not necessarily to be construed as preferred or advantageous over other aspects or designs. Similarly, examples are provided herein solely for purposes of clarity and understanding and are not meant to limit the subject innovation or portion thereof in any manner. It is to be appreciated that a myriad of additional or alternate examples could have been presented, but have been omitted for purposes of brevity.

Furthermore, all or portions of the subject innovation can be implemented as a system, method, apparatus, or article of manufacture using standard programming and/or engineering techniques to produce software, firmware, hardware or any combination thereof to control a computer to implement the disclosed innovation. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 9:
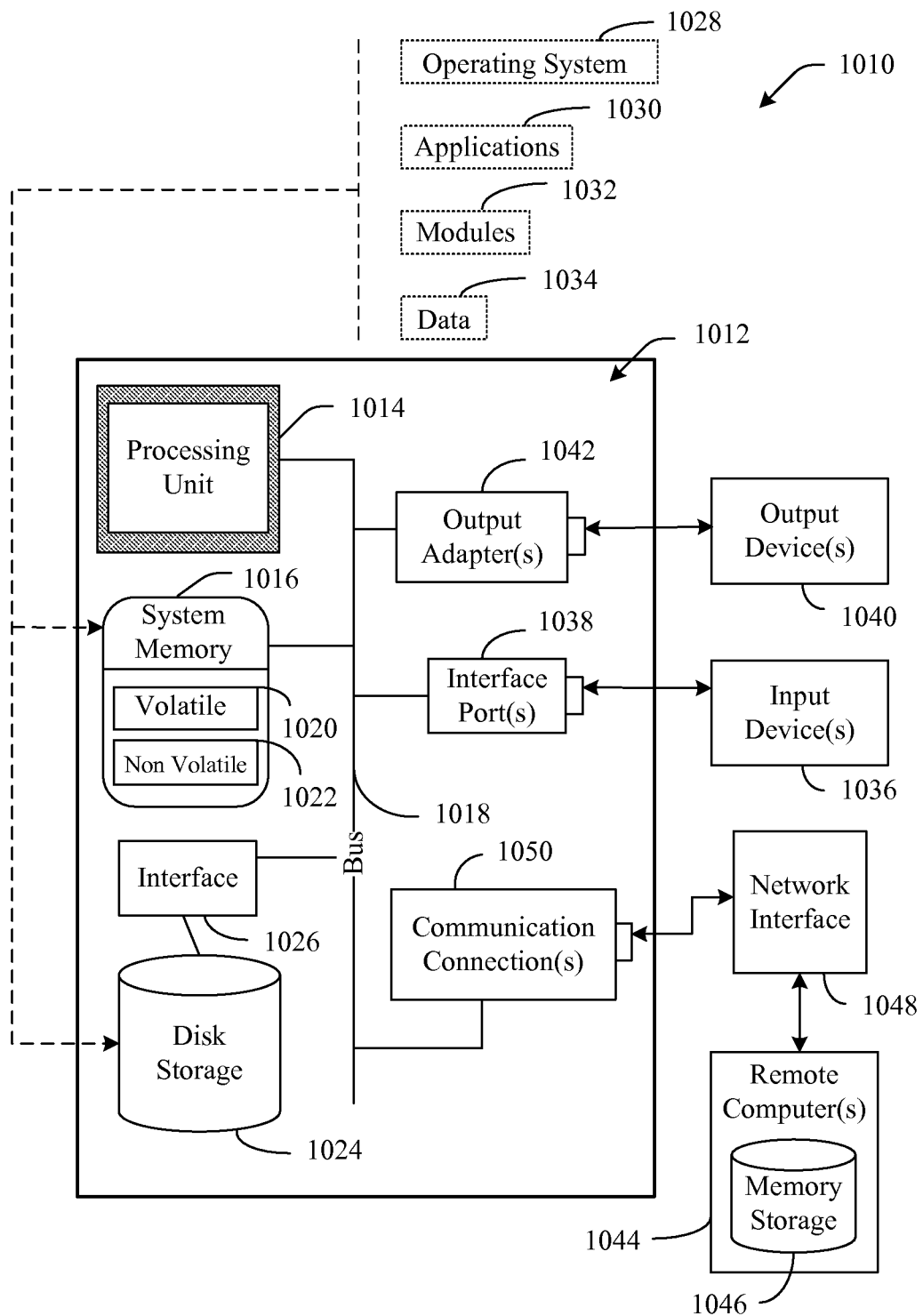
FIG. 9 illustrates an exemplary environment for implementing various aspects of the subject innovation.
Figure 10:
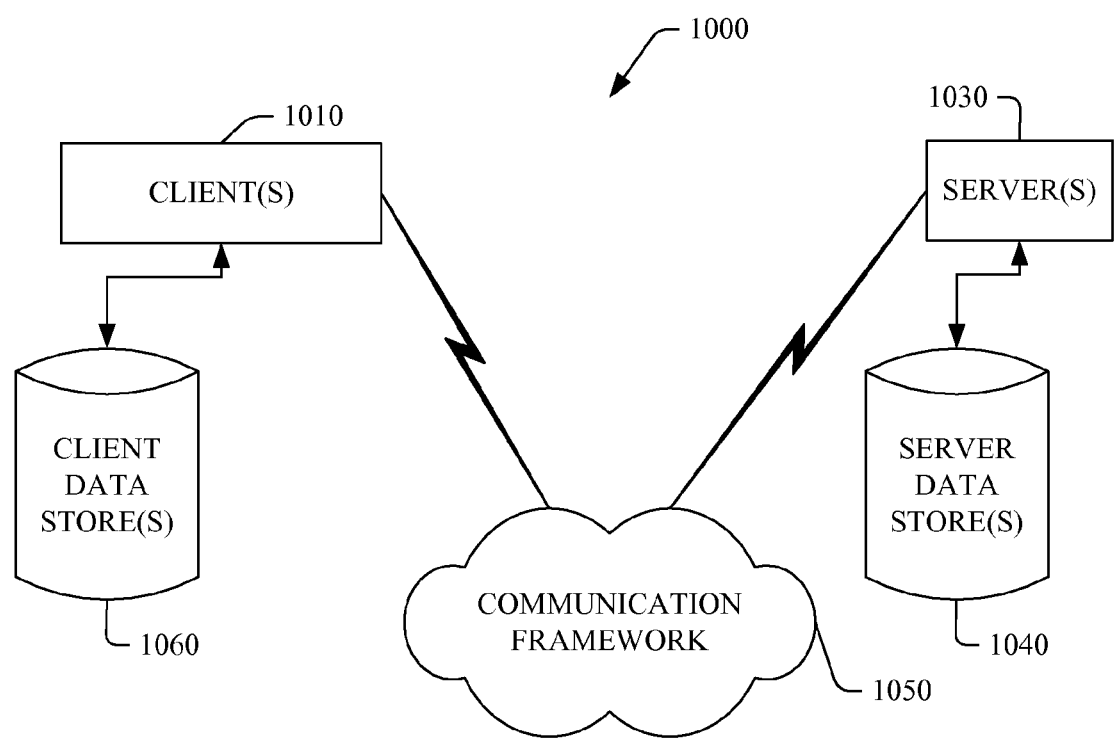
FIG. 10 is a schematic block diagram of an additional-computing environment that can be employed to implement the subject innovation.

In order to provide a context for the various aspects of the disclosed subject matter, FIGS. 9 and 10 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the innovation also may be implemented in combination with other program modules. Generally, program modules include routines, programs, components, data structures, and the like, which perform particular tasks and/or implement particular abstract data types. Moreover, those skilled in the art will appreciate that the innovative methods can be practiced with other computer system configurations, including single-processor or multiprocessor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the innovation can be practiced on stand-alone computers. In a distributed computing environment, program modules may be located in both local and remote memory storage devices.

With reference to FIG. 9, an exemplary environment 910 for implementing various aspects of the subject innovation is described that includes a computer 912. The computer 912 includes a processing unit 914, a system memory 916, and a system bus 918. The system bus 918 couples system components including, but not limited to, the system memory 916 to the processing unit 914. The processing unit 914 can be any of various available processors. Dual microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable ROM (EEPROM), or flash memory. Volatile memory 920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 912 also includes removable/non-removable, volatile/nonvolatile computer storage media. FIG. 9 illustrates a disk storage 924, wherein such disk storage 924 includes, but is not limited to, devices like a magnetic disk drive, floppy disk drive, tape drive, Jaz drive, Zip drive, LS-60 drive, flash memory card, or memory stick. In addition, disk storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used such as interface 926.

It is to be appreciated that FIG. 9 describes software that acts as an intermediary between users and the basic computer resources described in suitable operating environment 910. Such software includes an operating system 928. Operating system 928, which can be stored on disk storage 924, acts to control and allocate resources of the computer system 912. System applications 930 take advantage of the management of resources by operating system 928 through program modules 932 and program data 934 stored either in system memory 916 or on disk storage 924. It is to be appreciated that various components described herein can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computer 912, and to output information from computer 912 to an output device 940. Output adapter 942 is provided to illustrate that there are some output devices 940 like monitors, speakers, and printers, among other output devices 940 that require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems and DSL modems, ISDN adapters, and Ethernet cards.

FIG. 10 is a schematic block diagram of a sample-computing environment 1000 that can be employed as part of annotating in accordance with an aspect of the subject innovation. The system 1000 includes one or more client(s) 1010. The client(s) 1010 can be hardware and/or software (e.g., threads, processes, computing devices). The system 1000 also includes one or more server(s) 1030. The server(s) 1030 can also be hardware and/or software (e.g., threads, processes, computing devices). The servers 1030 can house threads to perform transformations by employing the components described herein, for example. One possible communication between a client 1010 and a server 1030 may be in the form of a data packet adapted to be transmitted between two or more computer processes. The system 1000 includes a communication framework 1050 that can be employed to facilitate communications between the client(s) 1010 and the server(s) 1030. The client(s) 1010 are operatively connected to one or more client data store(s) 1060 that can be employed to store information local to the client(s) 1010. Similarly, the server(s) 1030 are operatively connected to one or more server data store(s) 1040 that can be employed to store information local to the servers 1030.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims.

Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer implemented method comprising the following computer executable acts:
receiving a query written in XQuery for execution over an XML data collection retained in a computer-readable storage device, the query comprising at least one query expression, the at least one query expression comprising at least one of an element or an attribute;
responsive to receiving the query, accessing at least one XML schema for the XML data collection, wherein the XML schema specifies a content model, the content model specifying that that the at least one of the element or the attribute in the XML schema is typed through use of a wildcard;
identifying a section in the XML data collection that includes the at least one of the element or the attribute as a lax validation section;
mapping the lax validation section of the XML schema into a XQuery type system;
subsequent to mapping the lax validation section of the XML schema into the XQuery type system, automatically inferring a type for the at least one query expression such that the type for the at least one query expression is restricted from being typed with a wildcard; and subsequent to inferring the type for the at least one query expression, annotating the type inferred for the at least one query expression with at least one constraint.

2. The computer implemented method of claim 1 further comprising annotating nodes for a path expression that navigates down into the lax validation section.

3. The computer-implemented method of claim 1, further comprising, for a path expression with an explicit name test entering into a wildcard section, identifying whether the path selects an element or attribute that is known in a static typing context, or the path selects an element or attribute that is considered as any type.

4. The computer implemented method of claim 3 further comprising supplying type information and type inference rules.

5. The computer implemented method of claim 4 further comprising, to resolve a name inside the lax validation section, ensuring absence of disallowed names when employing a name space wild card constraint as a filter.

6. The computer implemented method of claim 1 further comprising querying via path expressions into a lax validation section.

7. The computer implemented method of claim 1 further comprising preserving knowledge of types to be encountered within a lax validation section.

8. The computer implemented method of claim 1 further comprising mapping the lax validation section into an Xpath type system.

9. The computer implemented method of claim 1 further comprising compiling expressions with knowledge for types involved.

10. The computer implemented method of claim 1, wherein the wildcard is xs:anyType.

11. The computer implemented method of claim 1 further comprising capturing semantics implied by the lax validation.

12. The computer implemented method of claim 1 further comprising constraining name spaces as a filter against statically known XML schema.

13. The computer implemented method of claim 1 further comprising resolving a name inside a lax validation.

14. The computer implemented method of claim 1, wherein that at least one constraint is a namespace constraint that indicates a set of namespaces that are employed to restrict the type.

15. A computer-implemented system, comprising:
a processor;
a data store that comprises a collection of XML schemas, wherein at least one schema in the collection of XML schemas specifies a content model, the content model comprising at least one of an element or an attribute that is typed with a wildcard, the at least one of the element or the attribute labeled as being laxly validated;
a memory that comprises at least one component that is executed by the processor, the at least one component comprising:
an annotation component that receives a query in XQuery for execution over an XML data collection, the query comprising at least one query expression, the at least one query expression comprises the at least one of the element or the attribute, and wherein the annotation component, responsive to receiving the query, annotates an inferred type of the query expression with a namespace constraint to facilitate type inference for a subsequently generated sub-expression of the query expression, wherein inferred type is restricted from being typed with the wildcard.

16. The computer-implemented system of claim 15, the at least one component further comprising a mapping component configured to map the at least one of the element or the attribute into an XQuery typing system.

17. The computer-implemented system of claim 15, the at least one component further comprising an optimization component configured to optimize operations based on knowledge preservation of types to be encountered within the at least one schema.

18. The computer implemented system of claim 15, the wild card being one of <xsd:any> and <xsd:anyAttribute> that support use of a processContents attribute with value "lax".

19. The computer-implemented system of claim 15, wherein the namespace constraint identifies at least one namespace to analyze to restrict the type.

20. A computer-readable storage memory storing instructions executable by a processor to cause the processor to perform acts comprising:
receiving a query for execution over an XML data collection, the query being in one of XQuery or XPath format, wherein structure of content of the XML data collection is defined by an XML schema, wherein the query comprises at least one query expression, the at least one query expression comprising at least one of an element or an attribute specified in the XML schema and typed with a wildcard;
responsive to receiving the query, identifying a portion of the XML schema that comprises that at least one of the element or the attribute that is typed with the wildcard;
determining that the at least one of the element or the attribute is to be laxly validated in the XML schema when compiling the query;
inferring a type of the at least one query expression responsive to determining that the at least one of the element or the attribute is to be laxly validated when compiling the query, the type of the at least one query expression is restricted from being typed with the wildcard;
subsequent to inferring the type of the at least one query expression, assigning a namespace constraint to the type of the at least one query expression;
generating a subexpression of the query expression; and
inferring a type for the subexpression of the query expression based at least in part upon the namespace constraint assigned to the type of the at least one query expression.

* * * * *